United States Patent [19]
D'Agosta

[11] Patent Number: 5,540,184
[45] Date of Patent: Jul. 30, 1996

[54] ANIMAL STALL HAVING ANTI-CAST SAFETY STRIP

[76] Inventor: Ralph D'Agosta, P.O. Box 2153, New Preston, Conn. 06777

[21] Appl. No.: 309,744

[22] Filed: Sep. 21, 1994

[51] Int. Cl.⁶ .................................................. A01K 1/00
[52] U.S. Cl. ...................... 119/523; 248/345.1; 119/516
[58] Field of Search ................................. 119/174, 13, 27, 119/705, 706, 157, 83; 248/345.1; 256/59

[56] References Cited

U.S. PATENT DOCUMENTS

| | | | |
|---|---|---|---|
| 1,761,233 | 6/1930 | Roe | 248/345.1 |
| 2,227,581 | 1/1941 | Henderson | 119/27 |
| 3,841,044 | 10/1974 | Brown et al. | 248/345.1 |
| 3,991,537 | 11/1976 | Brown | 248/345.1 |
| 4,201,359 | 5/1980 | Baslow | 248/345.1 |
| 4,926,796 | 5/1990 | Leopold | 119/157 |

FOREIGN PATENT DOCUMENTS 248903  3/1926  United Kingdom ........................ 119/13

*Primary Examiner*—Todd E. Manahan
*Attorney, Agent, or Firm*—John P. Halvonik

[57] ABSTRACT

There is disclosed a safety strip for horses and other animals to prevent casting. The strip may be attached to the walls of corrals and other structures that are used to contain horses and other animals. The strip may comprise a series of raised conical projections which provide a frictional surface for a horse to use as leverage to enable the horse to raise itself to an upright position within the confines of a narrow corral. The strips may be made in sizes that allow them to be used in a variety of differently sized and shaped walls. Apertures in the strips provide a method for mounting them to the wall by the use of nails for example.

5 Claims, 3 Drawing Sheets

ANIMAL STALL HAVING ANTI-CAST SAFETY STRIP

BACKGROUND AND FIELD OF THE INVENTION

The invention relates to the field of animal husbandry and in particular to a safety strip designed for attachment to walls and other static structures that may be used to contain animals. The strip may be placed on a wall in order to provide a gripping structure for a horse to use its hooves to leverage against and lift itself to an upright postion, if the animal is cast.

Cast (or in a cast position) is defined as a situation where a horse or other animal is in a location and/or position of not being able to return to its feet. Oftentimes, this is because of injury or sickness. FIG. 4 shows a horse lying down in a box stall (living quarters). The horse has all 4 legs and hoofs tucked under himself while laying down. At this point the horse is resting. If the horse attempts to roll over 180 degrees and does not have enough room, the horse rolls himself into a position where his back bone is on the floor and his feet are up against the wall. In this position he cannot get rolled back to his starting position. Due to his body position, at this point he has put his body weight and his center of gravity leaning in towards the wall, FIG. 5, and is in a cast position.

It is believed that there is a need for a means in stalls and corrals to provide a place on the wall that a horse or other animal can use to get itself up. Many times, horses are confined in narrow areas and when they lay in a horizontal position, and/or roll over, often being cast, they find that they cannot return to their feet. Oftentimes, the horse will thrash about in attempts to get up. Such attempts may result in injury, stress or other detriment to the horse. Human attendants may sometimes be available in case this occurs, however such is not always the case and in any event it would be beneficial to eliminate the need for such attendants.

It is believed that by providing a point on the stall where the horse or animal can place its hoove on the strip, the animal can then gain the leverage to get itself up. By using the safety strips that are the subject of the invention described herein, the horse can push its hoooves against the extended conical portions on the strips to a point where it can then get itself up. A solid safety strip may also be used under some circumstances.

It is believed that the invention will find its greatest uitlity by being attached to the wall of a stall or other static structure that is used to enclose large animals, particularly horses. The use of the extended portions in the strips enhances the grip of the horse's hoove against the wall. These extended portions should be of material that is pliable enough so that they will not cause injury to the hoove or the body of the animal. While it is thought that the safety strip will find its best use with horse stalls and containment areas, it is foreseeable that other animal enclosures may benefit from use of the strips.

DESCRIPTION OF THE PRIOR ART

While there are devices that are used to allow animals to climb on, such as those used for cats to climb up and perch, there are no devices known to the inventor that provide a means for a horse to utilize to raise itself to an upright position. Moreover, there are no devices known that provide a means for a horse or other large animal to leverage itself upon and thereby get up.

SUMMARY OF THE INVENTION

The invention is a safety strip device for attachment to animal enclosures, such as horse stalls, to enable animals such as horses to lift themselves to an upright position. The invention comprises a strip having a series of raised up portions that are of conical shape and are, preferably, about 2-6" in height and about 1.5" in diameter at the base of the portion (where that portion is joined to the strip). The conical portions should be of pliable material so as not to injure the horse's hoove or body. Alternately, the conical portions may be dispensed with and flat strip used.

The strip is backed, preferably, with a rubber layer on the backside of the strip-that side that is opposite the conical portions. A series of reinforcing ribs may be used as structural elements in order to enhance the strength of the strip. A series of holes in the strip are placed through both the front layer and the backing layer in order to provide a means through which the strip can be attached to a stall via nails, screws, etc.

It is an object of the invention to provide a means for a horses and other animals to gain leverage and position in order to lift itself up from a horizontal position.

Another object of the invention is to provide a means for an animal such as a horse get up from a confined space that is too narrow for the horse to spread its legs apart, or be in a position to close to a wall or side.

Another object of the invention is to prevent tension, injury and fatigue to horses and other animals that find themselves cast, or are confined in narrow areas such as stalls, corrals, etc.

Another object of the invention is to provide a method to insure that animals do not become stuck in a horizontal position in the event that human caretakers are not around to insure the animal's safety.

Another object of the invention is to provide a device to allow a horse to leverage against the wall of a barn, stall, etc. without injuring the hooves, and without getting caught on the animal or the clothing of the animal.

Other objectives of the invention will become apparent to those skilled in the art once the invention has been shown and described.

DESCRIPTION OF THE PREFERRED EMBODIMENT

Figure 1:
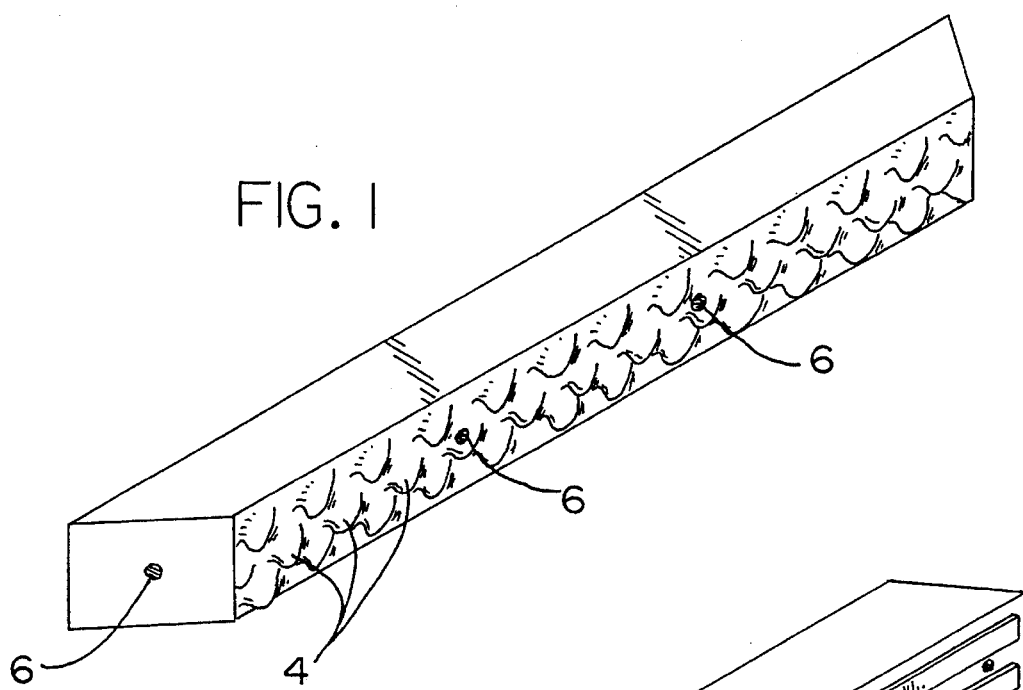
FIG. 1 Top view of the safety strip.
Figure 2:
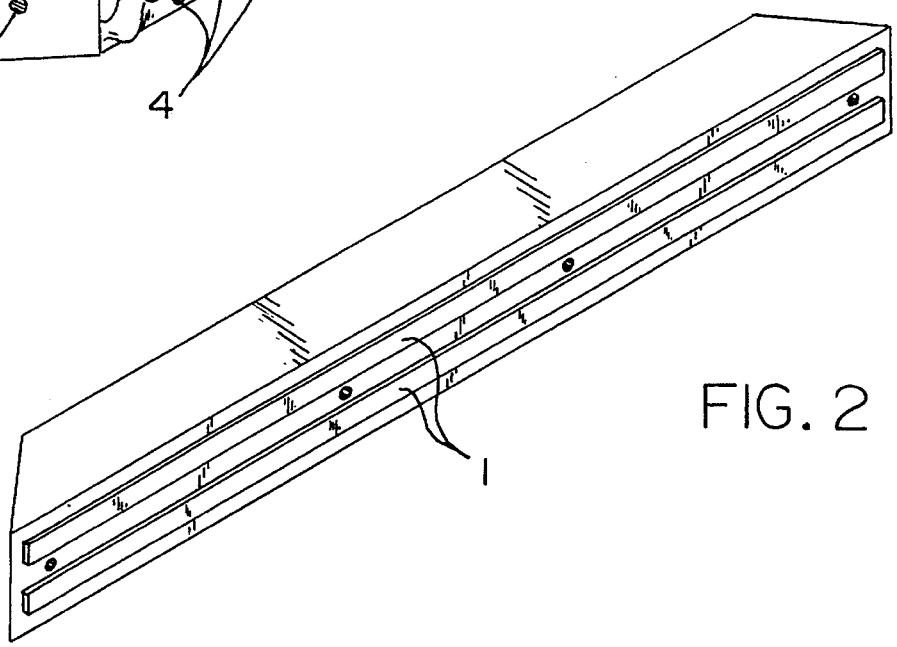
FIG. 2 Back view of strip.

The overall construction of the safety strip is as shown in FIG. 1. A series of raised conical portions 4 extend from the front surface of the strip. The strip may be chosen from a large variety of materials that will provide a relatively grippable, yet rigid, surface such as: rubber, wood, plastic, metals, etc. As the layers or strips may be cut down for better use, they should probably be made of materials that are easy to cut.

The strip may be several feet in length with about 5 feet being the preferred length. The width of the strip is, preferably, about 2–6 inches. The thickness of the strip is preferably about 1.5". The ends of the strip are tapered about 1–5" which creates a sloping surface 8 that extends from the edge of the bottom surface to the edge of the top surface.

Figure 3:
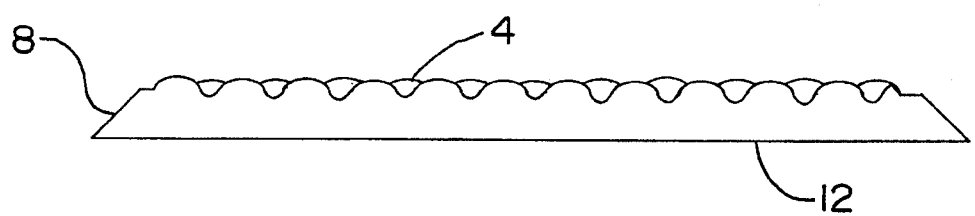
FIG. 3 Side view of strip.
Figure 4:
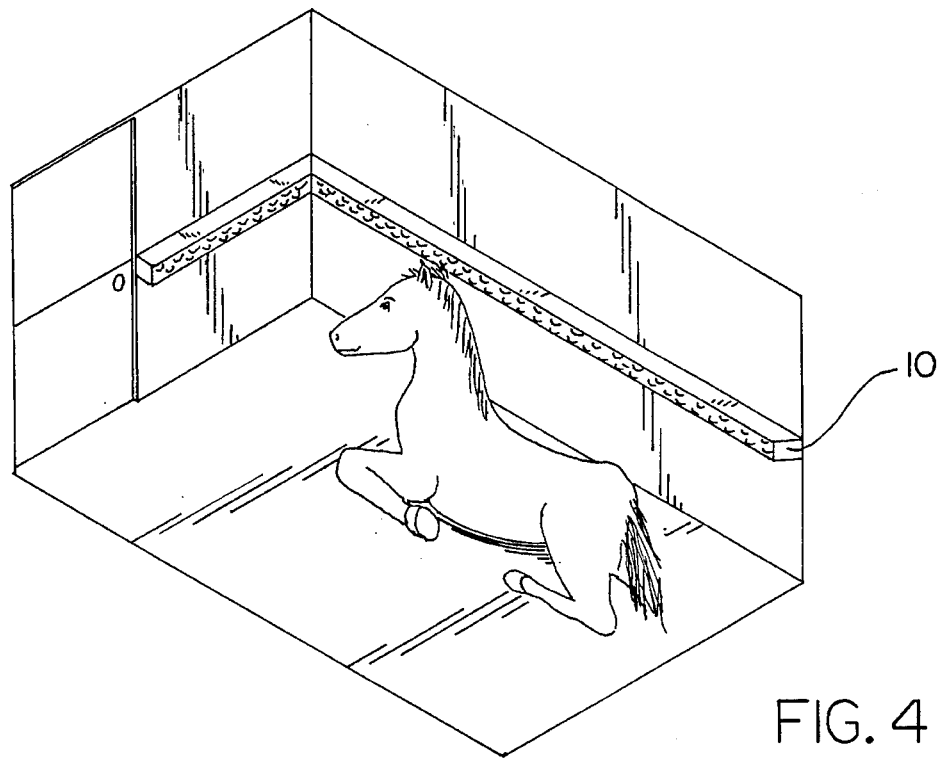
FIG. 4 Horse shown in uncast position.
Figure 5:
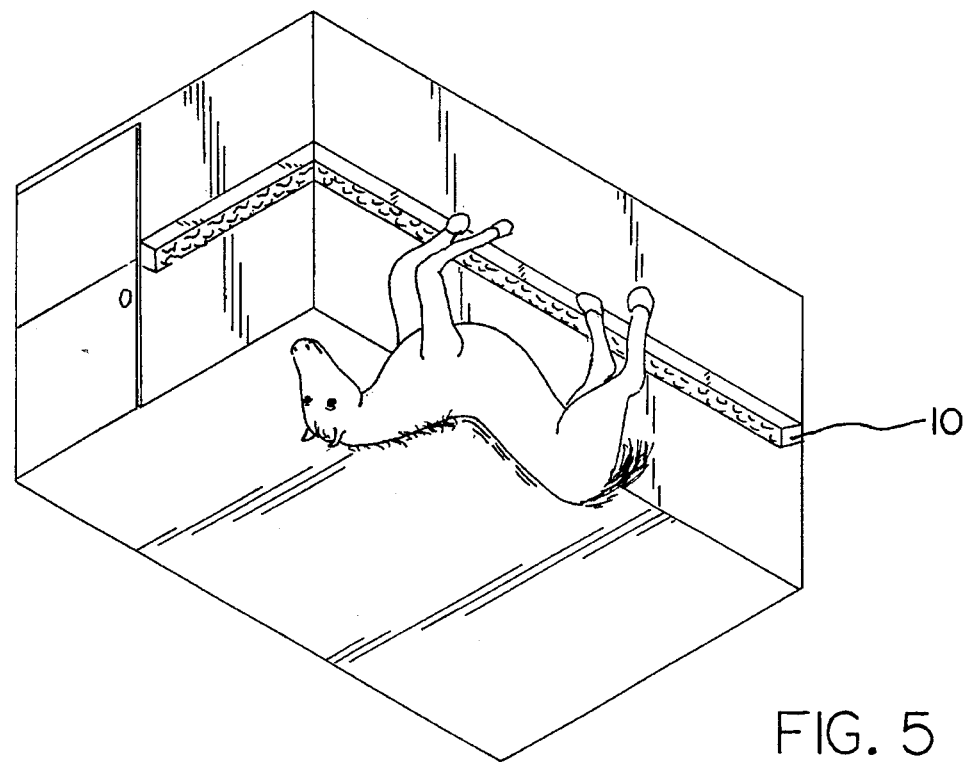
FIG. 5 Horse shown in cast position.

The front surface of the strip provides a point of attachment for the raised portions, or cones 4, that extend from this surface. The conical portions should be made or relatively flexible materials such as rubber, certain types of flexible plastic, leather, etc. The cones should be about 2–6" in height and about 1.5" in diameter at the base of the cone where the cone is attached to the upper surface of the strip. The cones are essentially rounded off at the top i.e. they do not have pointed tops but, rather, they have rounded tops, see FIG. 3.

The strip is to have a tapered end at 8, for the purpose of a smooth attachment point from the strip to the wall, to eliminate injuries to animal. This sloping surface also prevents animal or horse clothing from getting caught at this attachment point i.e. at the point where the bottom surface 12 is attached to the surface of the wall or other structure. The tapered end stabilizes the end of the strip under pressure. The strip may be made in several layers with an upper layer (having conical portions) of relatively pliable material e.g. rubber and a bottom layer (having bottom surface 12) of stronger material. The sloping surface also minimizes the chances what an animal or clothing would get caught at the interface of these layers.

It is believed that the use of flexible or malleable materials on the upper surface will add to the grip of the hoove as well as prevent injury to the hooves of the horse. With these considerations in mind, the materials may be chosen accordingly. The upper layer may be from one to several inches in thickness and probably about 2–6" in width. The cones will extend say, 2–6" from the surface of this front layer.

The conical portions 4 may be arranged in a series of rows, as shown (see FIGS. 1 and 3) with probably about three rows being preferred. Each row should be offset in relation to the other row so that the conical portions do not align with one another when they are viewed across the rows.

Ribs 1 reinforce the device and also stabilize the strip under pressure which is very important. They are made of rubber or other strong materials and may be added to the back surface 12 of the strip to enhance the rigidity of the strip. It is preferred that these ribs run the length of the strip. A series of apertures 6 should also run across the length of the strip and these should be of size to allow a screw or nail to be used to hold the strip to a wall.

When in use, the strip 10 is attached to a point on a part of the static structure, such as a wall, that encloses the animal. The actual placement of the strips may vary due to the differences in size of such animals but it believed that the strip would be best positioned at a point about 1–12" below the withers of the horse when the horse is in a standing position. The strips may be attached by nails, screws etc. The strips may be provided in sizes that allow them to be cut down in order to fit odd-sized walls, etc.

Figure 6:
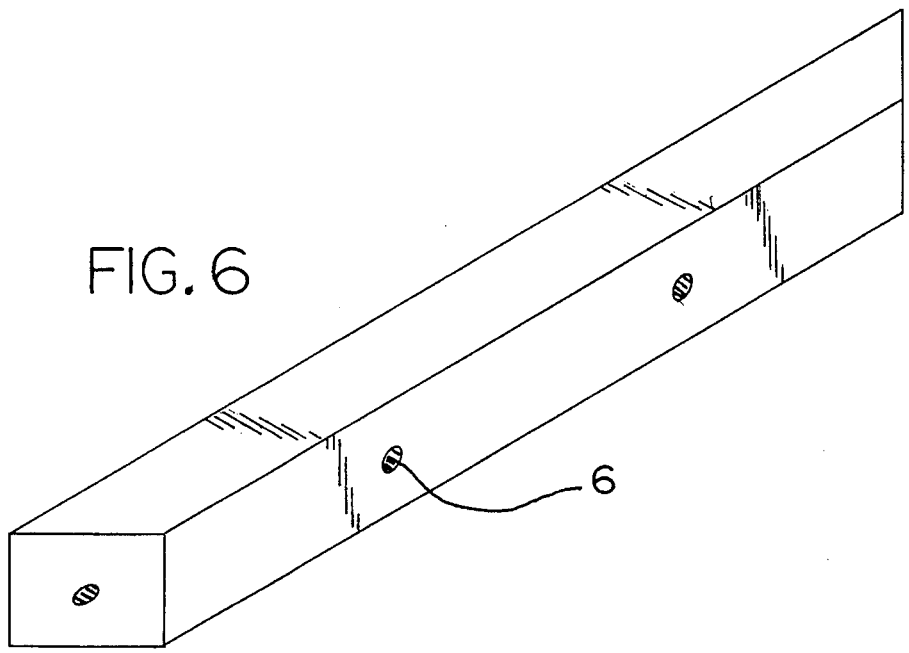
FIG. 6 Front view of solid strip.
Figure 7:
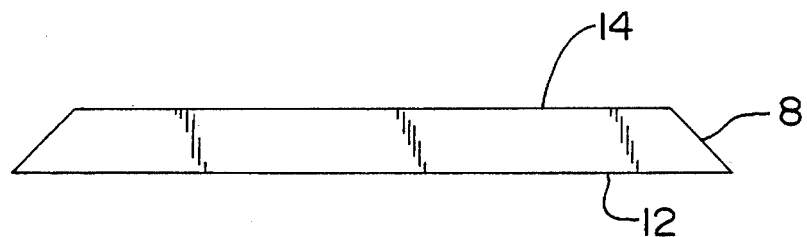
FIG. 7 Top view of solid strip.
Figure 8:
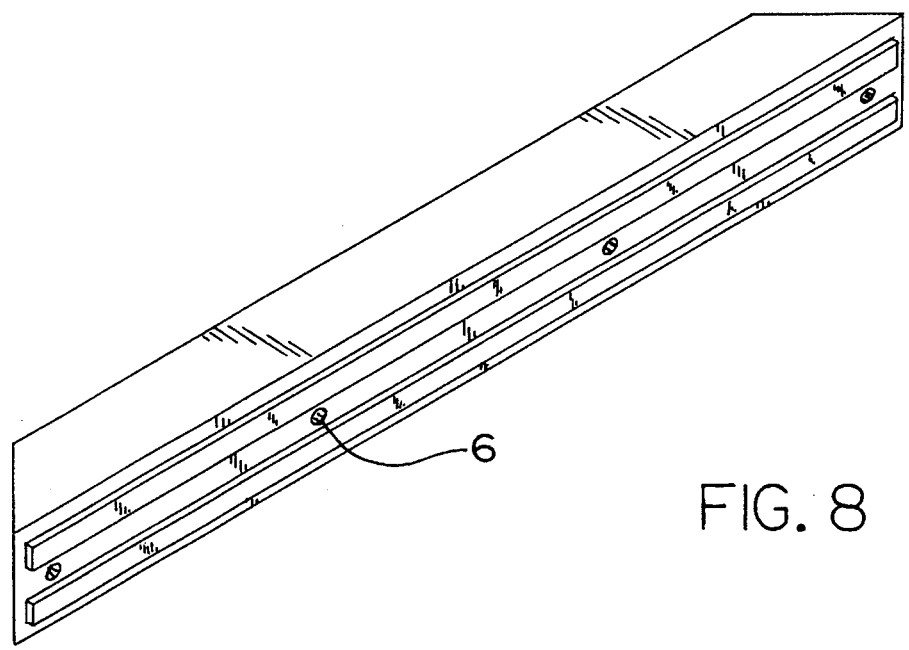
FIG. 8 Back view of solid strip.

FIGS. 6, 7, 8, show an optional strip with a flat upper surface 14 as opposed to the upper surface with conical portions. The option of a flat surface will allow use with wider range of animals from horses to elephants.

I claim:

1. An improved stall for animals having hooves comprising: a series of walls, said walls in connection with one another so as to form an enclosed stall, at least one of said walls having a frictional strip, said strip having a base layer made of relatively rigid material and said base layer having an under surface that is in connection with said wall, said strip having a layer of frictional material in connection with said base layer, said frictional layer having a plurality of rows of extended portions, said extended portions of modified conical shape having a top and a base, said top of rounded construction so as to create a space between said extended portions that roughly corresponds to the shape of the hoof, said strips located at a height on said wall adapted for the reach of a hoofed animal laying down.

2. The apparatus of claim 1 wherein said strip has a pair of ends, each said end having a sloping surface that creates an acute angle with said under surface of said base layer.

3. The apparatus of claim 2 wherein said frictional layer is made of rubber.

4. The apparatus of claim 3 wherein said extended portions are about 2–6" in height and about 1.5" in diameter at said base.

5. The apparatus of claim 4 wherein said rows are offset from one another, so that said extended portions of one row are not in linear relation with said extended portions of an adjacent row.

* * * * *